United States Patent
Pearce et al.

(10) Patent No.: US 8,838,788 B2
(45) Date of Patent: Sep. 16, 2014

(54) SYSTEM, METHOD, AND COMPUTER PROGRAM PRODUCT FOR CONTACT CENTER MANAGEMENT

(75) Inventors: Daniel L. Pearce, Lowell, MI (US); Timothy N. Lavin, Presque Isle, ME (US)

(73) Assignee: BalanceBPO Inc., Presque Isle, ME (US)

(*) Notice: Subject to any disclaimer, the term of this patent is extended or adjusted under 35 U.S.C. 154(b) by 0 days.

(21) Appl. No.: 13/409,467

(22) Filed: Mar. 1, 2012

(65) Prior Publication Data
US 2013/0077768 A1 Mar. 28, 2013

Related U.S. Application Data

(60) Provisional application No. 61/538,405, filed on Sep. 23, 2011, provisional application No. 61/549,918, filed on Oct. 21, 2011.

(51) Int. Cl.
- *G06F 15/173* (2006.01)
- *H04M 3/51* (2006.01)
- *G06Q 30/00* (2012.01)
- *H04M 3/493* (2006.01)

(52) U.S. Cl.
CPC .......... *H04M 3/5175* (2013.01); *H04M 3/5166* (2013.01); *G06Q 30/00* (2013.01); *H04M 3/493* (2013.01)

USPC ............ 709/224; 709/250; 709/227; 709/229

(58) Field of Classification Search
USPC ............... 379/88.01, 88.08, 88.09, 112.01, 379/265.02, 112.06; 709/250, 224, 227, 709/229, 218, 249, 351; 370/252, 253, 232, 370/244, 351, 352, 353
See application file for complete search history.

(56) References Cited

U.S. PATENT DOCUMENTS

| | | | |
|---|---|---|---|
| 6,556,659 B1* | 4/2003 | Bowman-Amuah | 379/9.04 |
| 7,224,790 B1* | 5/2007 | Bushey et al. | 379/265.13 |
| 8,149,996 B2* | 4/2012 | Nelson et al. | 379/45 |
| 8,300,797 B1* | 10/2012 | Benesh et al. | 379/265.03 |
| 2008/0250264 A1* | 10/2008 | Hourselt et al. | 714/2 |

* cited by examiner

*Primary Examiner* — Duc Nguyen
*Assistant Examiner* — Yosef K Laekemariam

(57) ABSTRACT

A system, method, and computer program product for customer contact management via voice, chat, e-mail and social network contacts includes a balanced service process (BSP) for maximizing first contact resolution (FCR) and CSAT. The BSP is incorporated within a contact center (single center, multiple centers and/or work at home), which receives voice calls, SMS messages, email, chat, or social media communications from customers. The BSP in real-time determines dispositions of such contacts, monitors and manages the performance of individual resolvers.

17 Claims, 8 Drawing Sheets

SYSTEM, METHOD, AND COMPUTER PROGRAM PRODUCT FOR CONTACT CENTER MANAGEMENT

CROSS-REFERENCE TO RELATED APPLICATIONS

This application claims the benefit of and priority to the following earlier filed provisional applications, each of which is incorporated herein by reference: Ser. No. 61/538,405, filed on Sep. 23, 2011; and Ser. No. 61/549,918, filed on Oct. 21, 2011.

BACKGROUND OF THE INVENTION

1. Field of the Invention

The present invention in its disclosed embodiments is related generally to the customer relationship management (CRM) process, and more particularly to a novel system, method, and computer program product for customer contact management that includes a balanced service process for accurately measuring and maximizing first call or contact resolution (FCR) and customer satisfaction (CSAT).

2. Statement of the Prior Art

Keeping customer service costs low while keeping customer satisfaction high is especially difficult in a struggling economy. Many companies respond by cutting staff in order to meet short-term financial targets. When the economy improves, they then ramp back up in an attempt to regain lost customers and boost the loyalty of the customers who remain.

While this approach can certainly reduce costs, it also reduces customer satisfaction and loyalty. A better way to approach the issue is to put more focus on taking care of the customer's issue during the first contact. Improving first call or contact resolution (FCR) not only impacts the cost of operations, but simultaneously affects customer satisfaction and retention. By improving FCR and reducing the total volume of repeat calls, companies can significantly lower service time and the overall cost to serve the customer. From a customer's perspective, improved FCR translates directly to higher satisfaction which further impacts the bottom line by boosting customer loyalty and revenues. As a matter of fact, having the issue resolved on the first contact has been cited in many studies as being the number one driver of customer satisfaction. It should be noted at this juncture that FCR as used herein can refer to first call resolution or first contact resolution, because a contact within the embodiments of the present invention may refer to any one or more of the following: voice calls, SMS messages, email, chat, or social media communications from customers.

For example, according to the Yankee Group, 30% to 35% of calls coming into the average contact center are repeat customer calls that require expensive "rework" by contact center agents. What can this mean to a company?

Assume, for example, that the average cost-per-call is about $5-$10 for a basic consumer customer service inquiry and $20-$45 for a Level 1 technical support issue. This amount can be multiplied by the number of the company's repeat calls. If that is not known, it can also be assumed that it is about 30-35% of the company's total calls. Then, the operational savings can be calculated by assuming an improved resolution rate.

As an example, if the contact center gets 100,000 calls per month, and the cost-per-call is $10, while 30% of calls are repeat calls, the cost of the repeat calls is $300,000 per month. A mere 10% reduction would yield a savings of $30,000 per month or $360,000 per year. Make the cost of a call $25, and the annual savings would be $900,000.

Benchmarking studies done by MetricNet, LLC of McLean, Va. USA indicate that first contact resolution is the single biggest driver of customer satisfaction. If a company wants loyal customers, the company needs to have customer satisfaction ranking in the 90s. These studies across all industries show that in order to have satisfaction rates this high, first contact resolution rates must match. Studies done by Customer Relationship Metrics of Sterling, Va. USA reveal caller satisfaction ratings will be 5-10% lower when a second call is made for the same issue.

Moreover, if companies have a complex situation where FCR is not realistic, just reducing the time to resolution can make a big difference. Industry Week, for example, reported on a large automotive manufacturer trying to increase market share in a new market by establishing a strong brand name and a superior customer service reputation. They wanted to deliver high quality service coupled with quick resolution of customer issues. One of their biggest challenges in achieving their goal of superior customer service was the time dedicated to warranty claims resolution. Once the issue was addressed, claims resolution time went from 174 days to 52 days. Warranty costs were reduced by 34% and customer satisfaction sky rocketed.

The pursuit of increasing FCR rates is the idealistic goal of any organization reliant upon contact center support. However, mountains of data, armies of analysts and management's ever changing reaction to FCR crises often leave both customer management staff and company leadership apathetic and unable to serve the customer. This leaves customers frustrated and often drives them away. At the core of the problem is an insufficient or nonexistent set of tools to confront the challenge and the lack of a detailed process dedicated to rectifying the situation, as a result: (a) confusing and ever changing processes are implemented; (b) staff morale is unfavorably impacted, decreasing tenure and increasing attrition; and (c) customers are lost.

SUMMARY OF THE INVENTION

Accordingly, it is generally an object of certain embodiments of the present invention to provide a system, method, and computer program product to accurately measure and manage first contact resolution (FCR) and customer satisfaction (CSAT) at an actionable (from agent to client) level.

More specifically, it is an object of those and other embodiments of the present invention to generate per-call data in real-time that accurately represents the customer's perception and opinion.

The above and other objects are provided by the balanced service process described herein, which provides (a) accurate real-time, intraday, and historical FCR and CSAT statistics; (b) dynamic reporting of issues driving call volume and customer experience; (c) analysis of contacts that were not resolved; and (d) a closed loop channel to define, report and correct trending issues that impede FCR and CSAT.

Through the implementation of the balanced service process, the system, method, and computer program product according to embodiments of the present invention will demonstrate, with empirical data, the following benefits: (a) lower operating expense; (b) reduced service related contacts; and (c) improved customer satisfaction.

Further objects, advantages, and novel features of the embodiments of the present invention and the structure and operation thereof, are described in detail below with reference to the accompanying drawings, wherein:

DETAILED DESCRIPTION OF THE EMBODIMENTS

Figure 1:
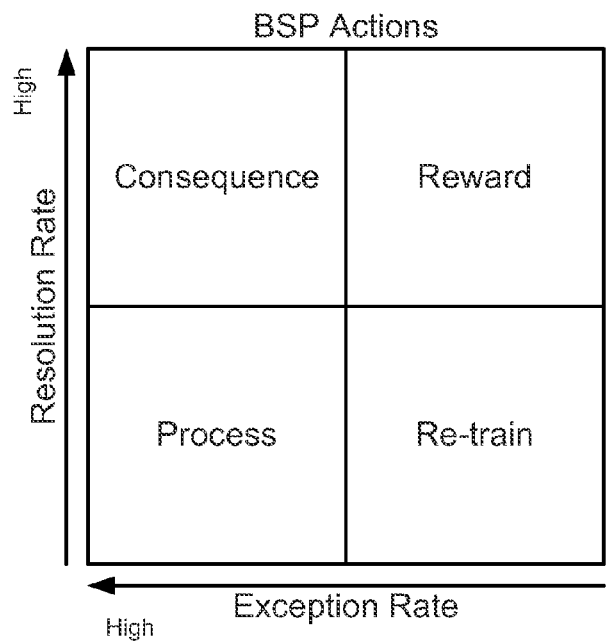
FIG. 1 depicts the exception rate versus resolution rate challenge faced by the balanced service process according to embodiments of the present invention.

Exemplary embodiments are discussed in detail below. While specific exemplary embodiments are discussed, it should be understood that this is done for illustration purposes only. In describing and illustrating the exemplary embodiments, specific terminology and contact types are employed for the sake of clarity. However, the embodiments are not intended to be limited to the specific terminology and contact types so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatuses and/or contact types for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may further include apparatuses and/or manual systems for performing the operations described herein. An apparatus or system may be specially constructed for the desired purposes, or it may comprise a general-purpose device selectively activated or reconfigured by a program stored in the device.

Referring now to the drawings, wherein like reference numerals and characters represent like or corresponding parts and steps throughout each of the many views, there is shown in FIG. 1 the exception rate versus resolution rate challenge faced by the business service process according to embodiments of the present invention.

The balanced service process (BSP) according to embodiments of the present invention generates FCR, CSAT and cause codes—issues that are driving call volume—data, all in actionable or real-time. The data, when analyzed, creates action plans to address process, behavioral, and recurrent training problems and also serves as the basis for an agent's reward and recognition program.

FCR is inarguably the most important metric in the contact center environment, simultaneously driving and addressing customer satisfaction, quality and efficiency. Cause codes allow for tactical intraday, and strategic long-term, management of the top issues driving customer contacts.

Fundamentally, the BSP relies on "resolvers" (or contact center agents) to generate FCR and CSAT data. At the end of every contact the resolver must disposition each contact before another is presented: "YES" if the issue was resolved and "NO" if the issue was not resolved. Low "exception rates" (i.e., where there are different resolver and customer dispositions for the same record) and high "resolution rates" (i.e., where the resolver and customer both disposition the record as "YES") is the goal. Low exception rates and low resolution rates suggest training is required. High exception rates and low resolution rates indicate a process or policy breakdown, and high exception rates with high resolution rates suggest resolver behavior issues.

The accuracy of the BSP can be measured by the level of alignment with the customers' perception of resolution and satisfaction. If the customer and the resolver are in synchronicity with regard to the perception of both, and assuming all policies were adhered to, the contact may be declared resolved and accurately measured with great confidence. Conversely, when there is a divergence in the perception of resolution between the resolver and customer, there are valuable process, training, and resolver behavior management opportunities. When the process is applied, resolution and CSAT barriers quickly emerge and targeted actions can be initiated.

Portions of some processes similar to the BSP may have been deployed in other contact centers. However, without deployment of the processes present in the BSP, the reliability of data and the ability to consistently execute an FCR and CSAT strategy is not possible. Short term FCR and CSAT "campaigns" often reduce frontline employees to apathy and fear, and create ongoing client stress. Survey results can "indicate" opportunities for improvement, but are of little value over the long run unless they are integrated at the operational level and used for ongoing management of the business. BSP makes FCR and CSAT an intraday-managed metric, analogous to service level or handle time. Moreover, there is human behavior at play. When a resolver knows that he/she must accurately disposition each record before proceeding to the next contact, and will be evaluated primarily on the outcome, a culture of resolution is institutionalized enterprise wide. Without the BSP concerns related to a built-in bias at the resolver level are justified; however, the BSP ties each resolver and customer's dispositions together via a simple survey, asking the same two questions: "Was the issue resolved?" "Was the customer satisfied with the service?" This counterbalance allows patterns in synchronicity between the resolver and the customer's perception to emerge, and actions to be created to address the gaps.

Obviously, customers are more concerned with issue resolution than contact resolution. The contact is just the means to the end, in the customer's perception. Recognizing this, the customer IVR survey strategy that the system, method, and computer program product executes is sensitized to the type of issue that was reported. For example, if the contact was a billing concern, the customer may be surveyed after they have received the next bill to determine FCR rather than immediately, post-contact. In this example, the customer may think their issue has been resolved but doesn't really know for sure until the correction is observed on the next bill. In an environment where the resolver has the tools to resolve the issues upon first contact, post-contact surveys are deployed. Either way, milestones must be decided upon and used if necessary as triggers for customer surveys to ensure the accuracy of data.

Analytics may also be used to generate an automated cause code. Such analytics may comprise voice analytics, which produce an automated cause code for each contact, and presents them in real-time and historically. The cause codes may culminate in performance management software known as TruView, and they are presented in descending order within a real-time dashboard. Material increases in individual cause codes generate an alert, informing management that a particular "on-the-rise" issue may be of concern and may require intervention, lest FCR rates are impeded.

TruView also generates exceptions (which are defined as variances in responses between the resolver and the customer), which are then reviewed by a Data Accuracy Assurance (DAA) team. With 100% contact recording, the DAA analyst/supervisor reviews contacts and makes the determination as to whether exceptions are rooted in process, skill or behavior. As trends develop, targeted action plans are created and executed upon.

As processes are progressively fixed and training and behavior issues are addressed, FCR and satisfaction rates increase. Measures to ensure resolver performance is consistently at or above standard are applied as individual resolvers work through learning curves or remediation.

Figure 2:
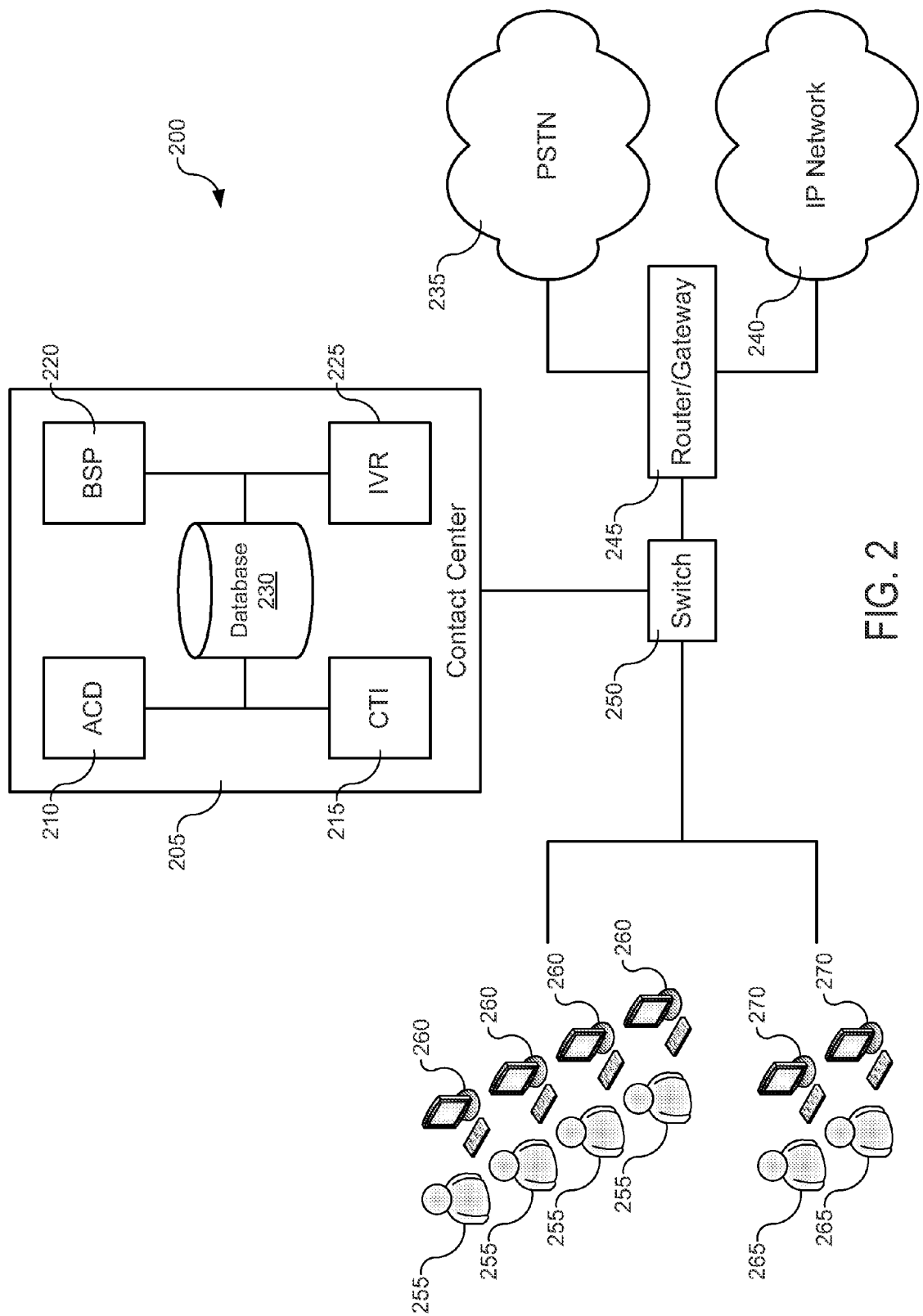
FIG. 2 depicts a high-level block diagram of a system for customer relationship management according to embodiments of the present invention.
Figure 4A:
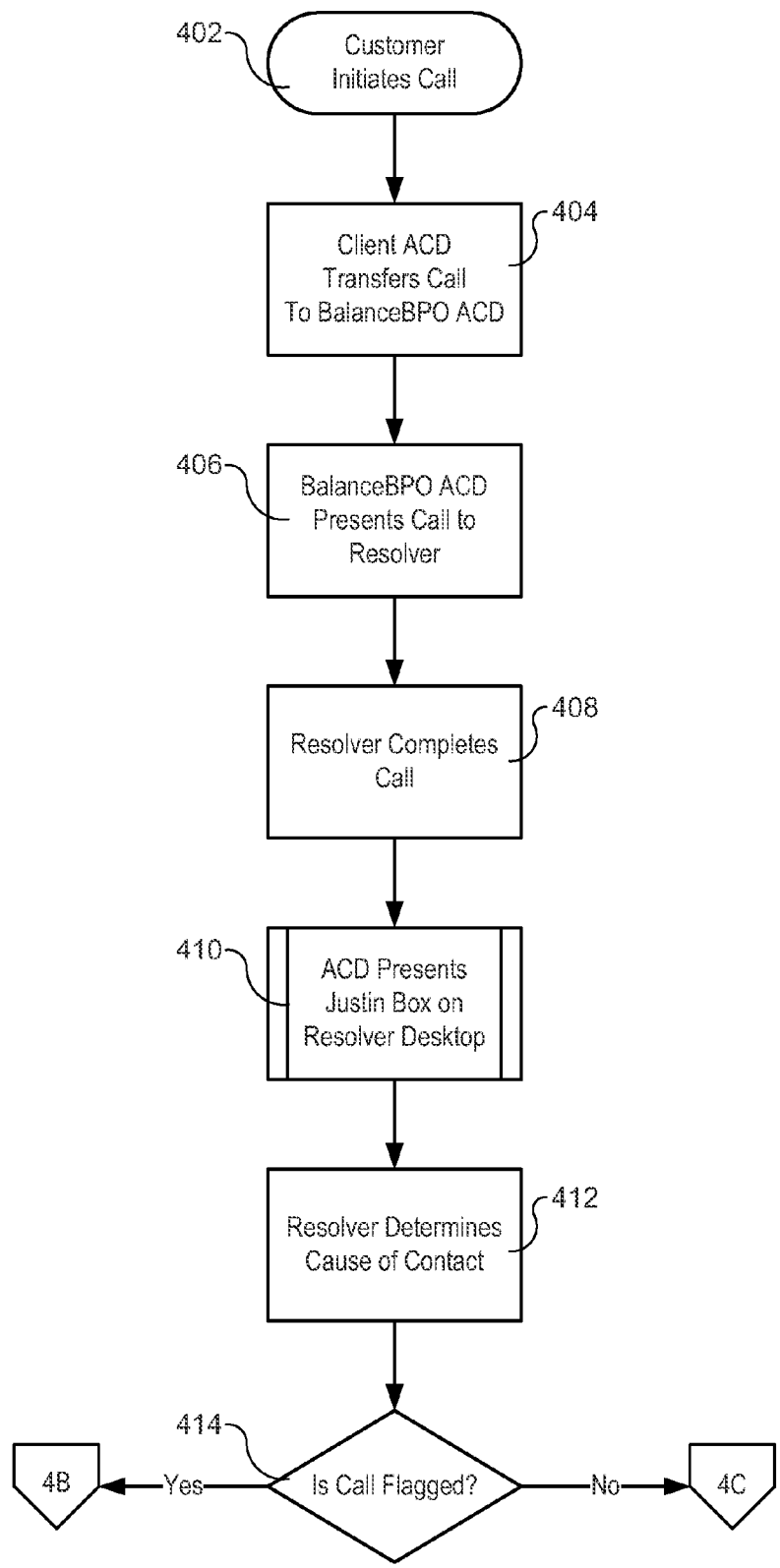
FIGS. 4A through 4F depict exemplary flowcharts for maximizing first contact resolution according to one embodiment of the present invention.
Figure 4B:
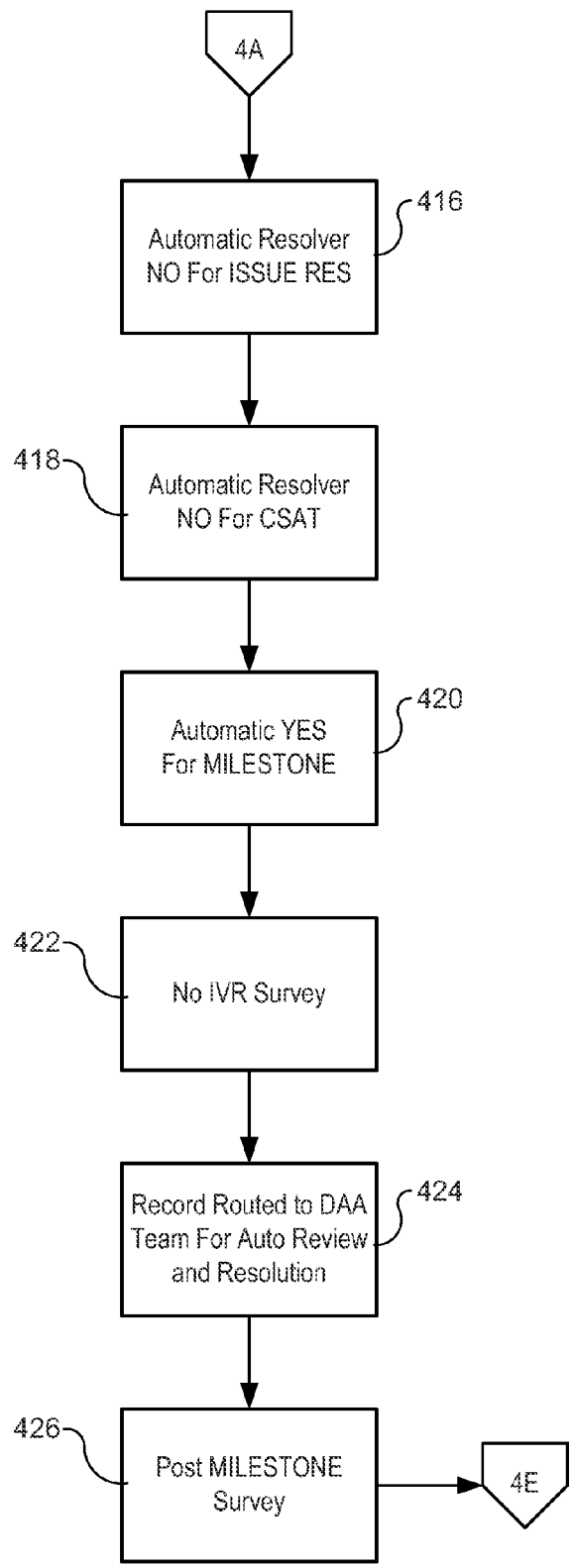
Figure 4C:
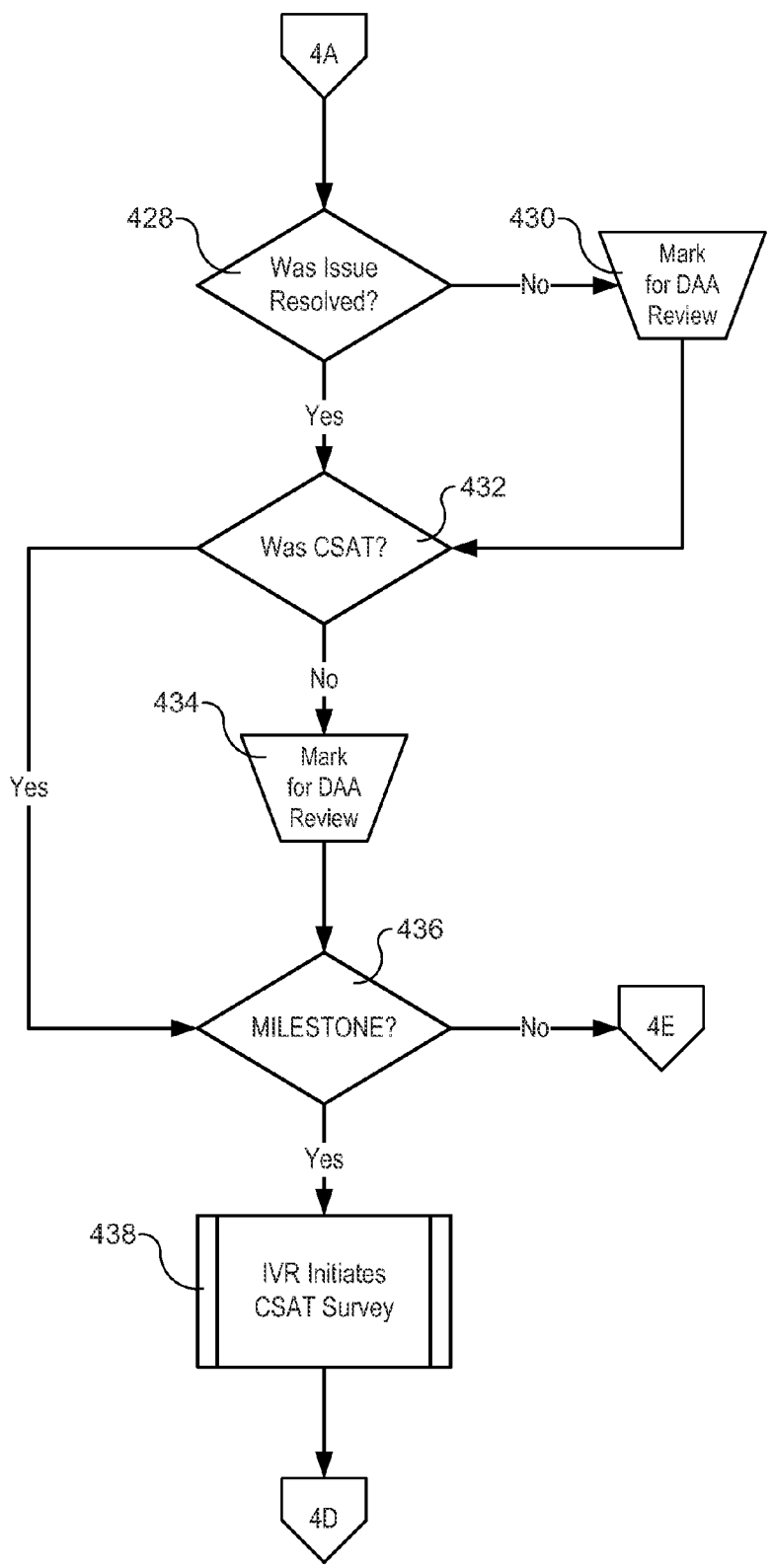
Figure 4D:
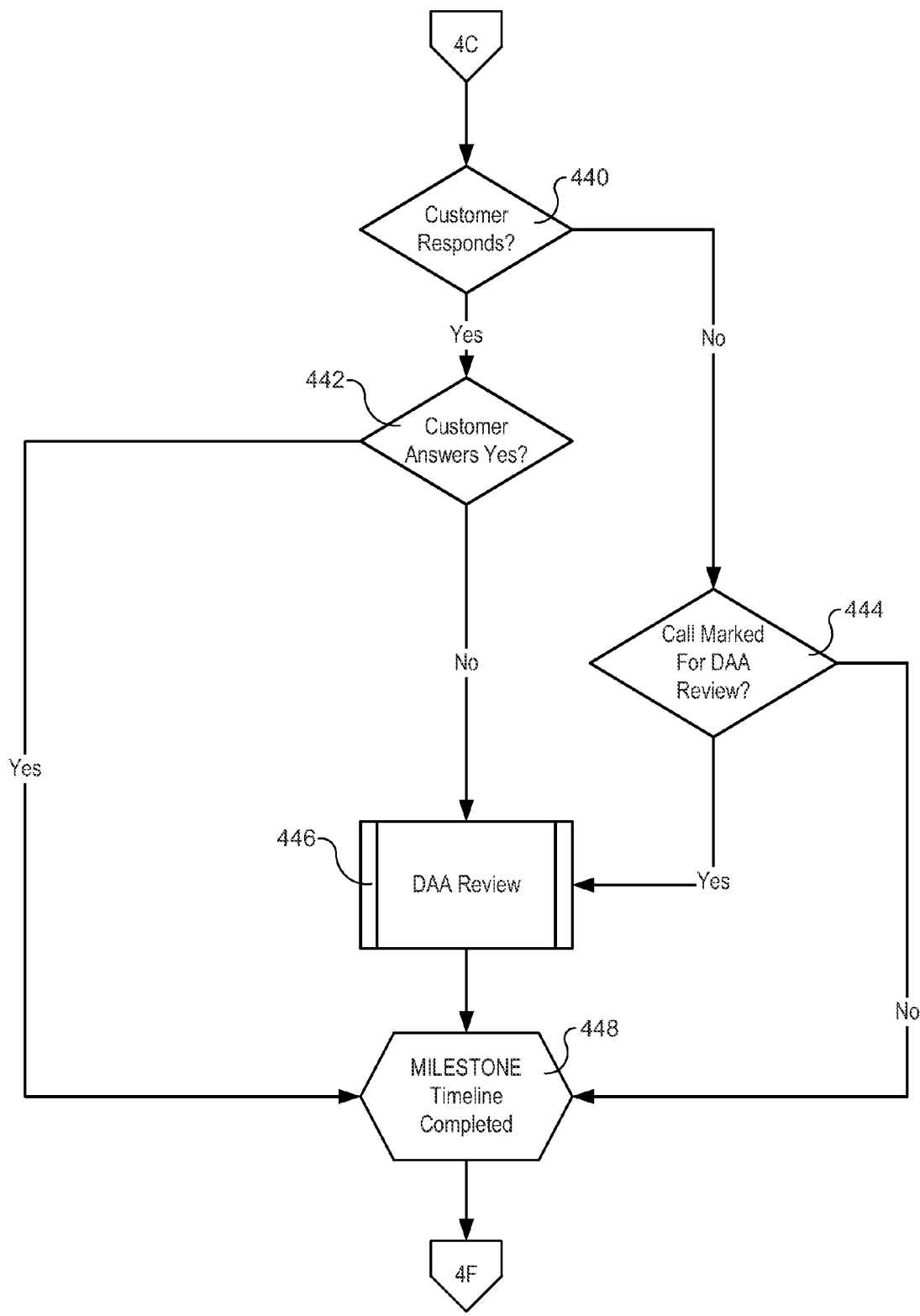
Figure 4E:
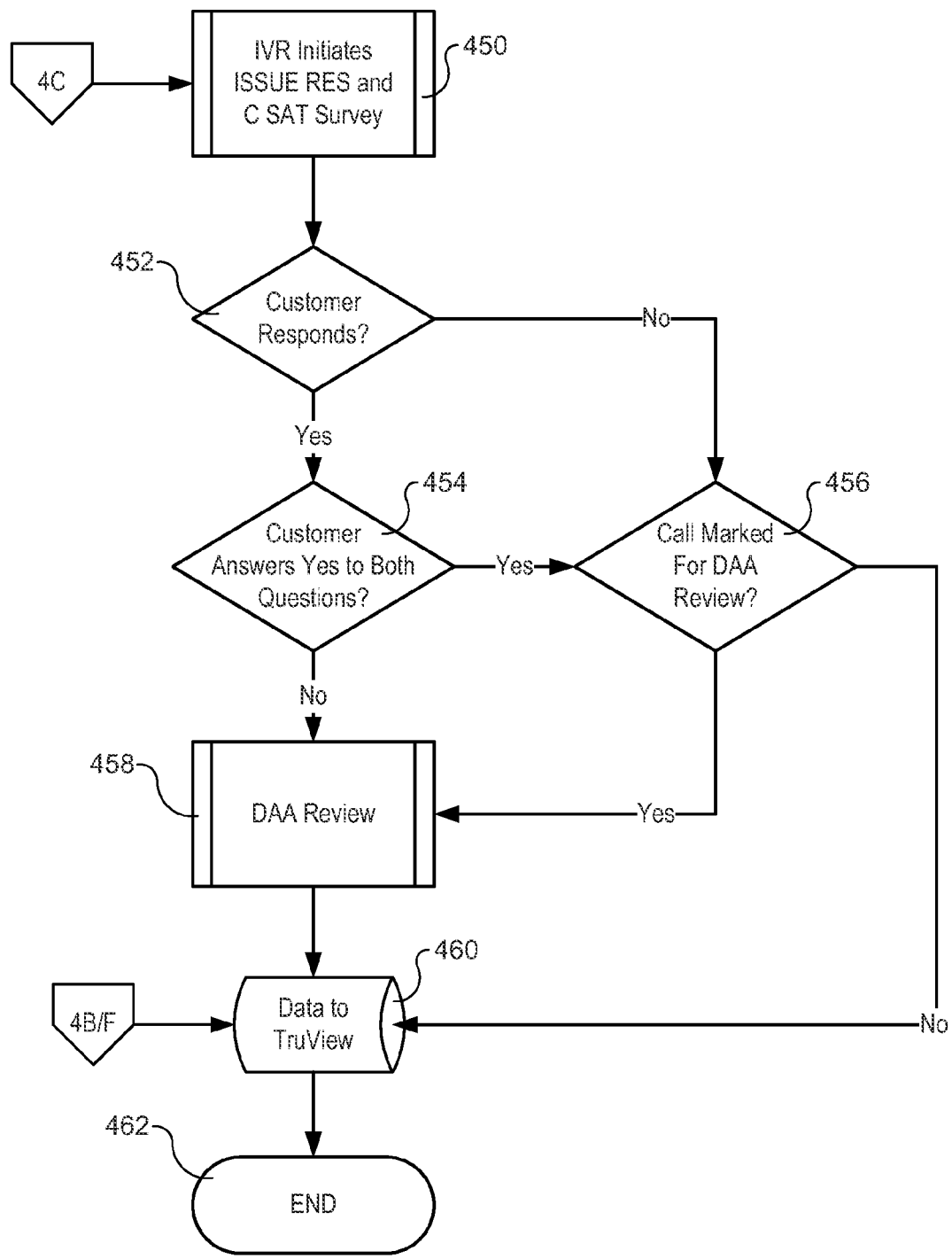
Figure 4F:
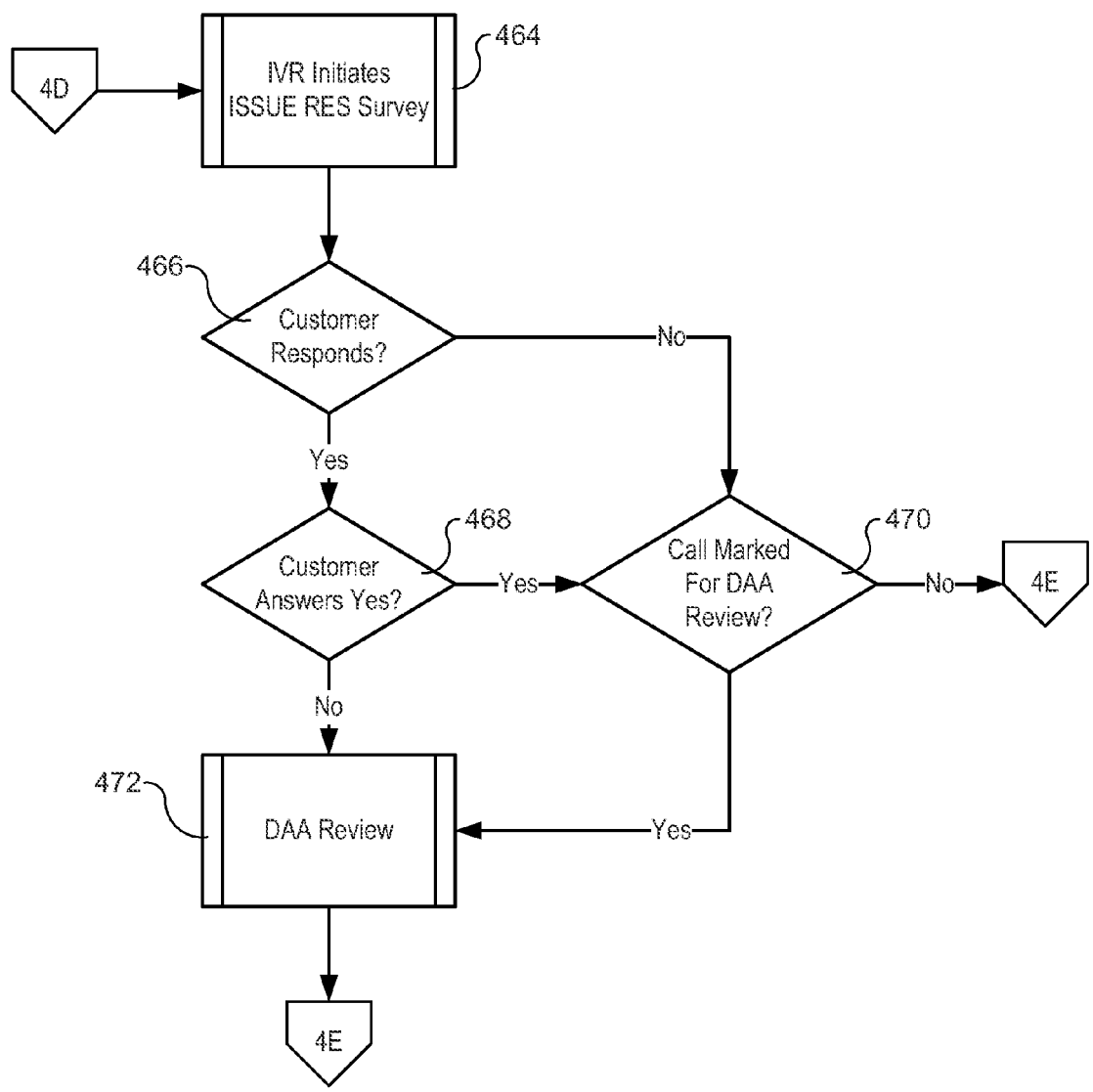

Referring now to FIG. 2, there is shown a high-level block diagram of a system 200 for customer relationship management according to embodiments of the present invention. System 200 generally comprises a contact center (which may comprise, e.g. single or multiple locations and/or work at home) 205, which may include Automatic Call Distributor (ACD) means 210, Computer Telephony Integration (CTI) means 215, the Balanced Service Processor (BSP) 220, Interactive Voice Response (IVR) means 225, and a database 230.

As is known, ACD means 210 may suitably comprise a device or system that distributes incoming calls to a specific group of terminals that agents (i.e., resolvers 255 or their supervisors 265) use. It is often part of a CTI system. Routing incoming calls is the task of the ACD means 210. ACD systems are often found in offices that handle large volumes of incoming phone calls from callers who have no need to talk to a specific person but who require assistance from any of multiple persons (e.g., customer service representatives) at the earliest opportunity. The system consists of hardware for the terminals and switches, phonelines, and software for the routing strategy. The routing strategy is a rule-based set of instructions that tells the ACD means 210 how calls are handled inside the system. Typically this is an algorithm that determines the best available employee or employees to respond to a given incoming call. To help make this match, additional data may be solicited and reviewed to find out why the customer is calling. Sometimes the caller's caller ID or ANI, or the dialed number (DNIS) may be used. More often, a simple interactive voice response such as may be used with IVR means 225 is used to ascertain the reason for the call.

Alternatively, ACD means 210 may suitably comprise an internet call management device of the types described in U.S. Pat. No. 8,005,024, entitled "Method For Establishing An IP Video-Conference Using A Telephone Network For Voice Transmission," U.S. Pat. No. 6,819,667, entitled PSTN-Internet Notification Services," and U.S. Pat. No. 6,404,860, entitled "System And Method For Internet Call Management With Text-To-Speech Messaging," each of which is incorporated herein by reference.

CTI means 225 may be used for other functions such as screen pops; call information display (ANI/DNIS); dialing (e.g., power dial, preview dial, and predictive dial; phone control in general and more particularly call control and feature control; transfers; advanced call reporting functions, etc.).

System 200 is connected to receive calls from a PSTN 235 and IP network 230. As is known, the PSTN 235 is the network of the world's public circuit-switched telephone networks, in much the same way that the Internet is the network of the world's public IP-based packet-switched networks (conceptually shown in FIG. 2 as IP network 240). Originally a network of fixed-line analog telephone systems, the PSTN 235 is now almost entirely digital, and now includes mobile as well as fixed telephones. It is sometimes referred to as the Plain Old Telephone Service (POTS).

Phones used to access the system 200 may be conventional wireline phones, wireless phones, IP phones, satellite phones, and the like. As is known, use of the phones by users may provide certain telecommunications features such as Automatic Number Identification (ANI) and Dialed Number Identification Service (DNIS). ANI provides the phone call recipient with the caller's phone number. The technology and method used to provide this information is determined by the service provider, and is often provided by sending DTMF (i.e., digital tone multi frequency) tones along with the call.

Also known as Automated Number Identification or Calling Line Identification (CLI), ANI may arrive over the D channel of an ISDN PRI circuit (out-of-band signaling), or before the first ring on a single line (inband signaling). Caller ID is the local phone company version of ANI, and is usually delivered inband.

In contact center applications, ANI displays the number of the caller to the phone representative or resolver in real-time. Among other things, the contact center can use the information to process the call based upon prior history or can forward the call to a different department or organization.

DNIS is a service sold by telecommunications companies to corporate clients that lets them determine which telephone number was dialed by a customer. This is useful in determining how to answer an inbound call. The telecommunications company sends a DNIS number to the client phone system during the call setup. The DNIS number is typically 4 to 10 digits in length.

For example, a company may have a different toll free number for each product line it sells. If a contact center is handling calls for multiple product lines, the switch that receives the call can examine the DNIS, and then play the appropriate recorded greeting. Another example of multiple toll free numbers might be used for multi-lingual identification. A dedicated toll free number might be set up for Spanish speaking customers.

With IVR (i.e., interactive voice response) systems, DNIS may be used as routing information for dispatching purposes, to determine which script or service should be played based on the number that was dialed to reach the IVR platform. For example, 0906 123 4567 and 0906 123 4568 may well both connect to the same IVR system, but one number may be required to provide a competition service and the other might be an information line. The DNIS is what distinguishes these lines from each other and hence the IVR will know which service to provide to the caller.

A phone call, chat, or email comes into the contact center 205 through the PSTN 235 or IP network 240. It is processed through a router/gateway 245 and switch 250 to the contact center 205. The contact center 205, in turn, decides which agent/resolver 255 gets the contact and performs the balanced service process (BSP) according to embodiments of the present invention described herein.

Figure 3:
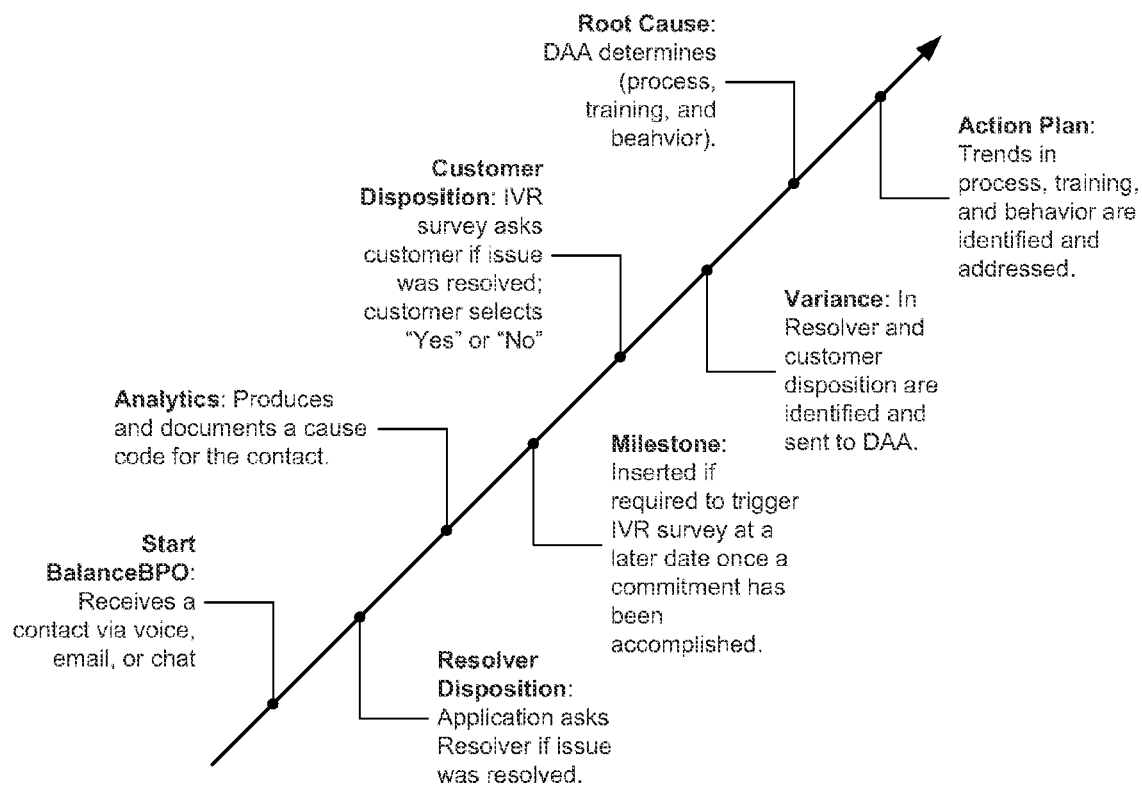
FIG. 3 depicts the business service process according to embodiments of the present invention.

The BSP 220 consists of the following successive components as illustrated in FIG. 3. Data Generation is the first step, in which the resolver disposition of contact (RDP), customer disposition of contact (CDP), and FCR calculation are determined. A Cause Code may be manually determined or automatically generated by use of voice analytics. Data Accuracy Assurance (DAA) is then used to determine exceptions, and monitoring/call review. The exceptions are then analyzed As defined above, the steps of the BSP 220 may include an "action plan," which sets forth the actions stemming from trends in exception analysis related to (a) process; (b) training; and (c) behavior. An "application cause" is the primary reason the customer contacted the contact center 205 as displaced in the client's application. "Behavior Reconditioning" may comprise the actions stemming from data that illuminates resolver behavior (e.g., deliberate miscoding of dispositions) that requires some or all of; coaching, counseling, termination, and when completed, increases data accuracy and FCR rates.

Resolved rate or "Billable Resolution Rate" comprises a metric that can be used to account for cost of bill the client for resolved contacts only. It may be calculated as follows: TOTAL "YES" RDP+TOTAL "OUT OF CONTROL" RDPs (as determined by DAA).

A "contact" may comprise the act of a customer contacting the contact center 205 (i.e., phone, chat, e-mail). Alternatively, a "contact" may comprise customer queries via social media. The ability to effectively deal with such customer queries requires companies to have in place some form of system to monitor what is being said about the company across various social media channels, including blogs, Twitter and LinkedIn. Dozens of such services exist to help, feeding companies all sorts of information on what is being said about them, based on whatever key words they select.

A growing number of companies are now trying to manage those transactions, so they come in to a contact center queue just like a phone call does. The BSP 220 may also queue such interactions, deliver them to appropriately skilled agents/resolvers 255, monitor the response and report on the outcomes. The BSP 220 may even keep track of which agent/resolver 255 handles each interaction, in case any follow-up is required.

A "Cause of Contact" may comprise the primary reason for the customer contacting the contact center 205. It may be derived and digitally converted to a Cause Code and sent to TruView via Voice Analytics.

A "Cause Code" may comprise the coding that resides in TruView related to the Cause of Contact that may be digitally derived via Voice Analytics.

A "CDP" (or Customer Disposition) may comprise the record of the customer's response to the IVR survey (e.g., "Was the issue resolved?"). The DAA (or Data Accuracy Assurance) team analyzes exceptions and determines root cause, broken into three major components, (a) process; (b) training; and (c) behavior. Data may comprise the total numbers of "YES" and "NO" dispositions, which are generated by resolvers and customers and is used for operations, decision making and planning.

A "Disposition" may comprise responses to surveys which ask resolvers and customers "Was the issue resolved?" It is mandatory that the resolver responds at the end of each contact, via TruView. The customers are given the option of post call—and post any milestones—via IVR survey. Responses are either "YES" (i.e., the issue was resolved/customer was satisfied) or "NO" (i.e., the issue was not resolved/customer was not satisfied). Responses become data. An "Exception"

may comprise a different disposition/response for the same record(s) as dispositioned by the resolver and the customer.

An "Exception Analysis" may comprise the determination made by DAA regarding the root cause of the Exception. Among such root causes are: (a) client process; (b) CRM process; (c) resolver training; and (d) resolver behavior. The "Exception Rate" may comprise the percentage of variances in responses between the customer and the resolver (calculated as TOTAL EXCEPTIONS/TOTAL CDP's).

"Milestones" may comprise the events that trigger the initiation of customer surveys (e.g., billing dates, return dates, etc.). Surveys must be tied to milestones to ensure that the customer's perception of resolution is accurate.

"Process Reconditioning" may comprise actions stemming from data that illuminates a process, either on behalf of the BPO or client that requires repair and when completed, should increase FCR.

"Recurrent Training" may comprise actions stemming from data that illuminates a need for refresher training for one, some or all resolvers who support a certain product, service, or process, when completed, should increase FCR.

"Resolution Rate" may comprise the percentage of contacts that the provider resolves calculated as (RDP "YES"/TOTAL CALLS HANDLED).

TruView supports BSP, and displays key performance metrics in real-time, including—and most importantly—FCR statistics and CSAT. TruView resides on every resolver's, supervisor's, and client's desktop 260, 270, providing the necessary feedback required optimizing intraday FCR performance.

At the end of each contact, the resolver is presented with two question(s), 1) "Was this issue resolved?" 2) Was the customer satisfied with the service received? The resolver must then select one of two radio buttons, "YES" or "NO". The response is sent to the TruView database 230 where it will await CDP or DAA analysis.

The FCR Rate and CSAT rate are immediately populated in the TruView database 230 along with the number of contacts the agent/enterprise has handled within the same time period. Contacts handled data is generated from the ACD 210. The FCR rate for individual resolvers, supervisors, operations managers, accounts, clients and enterprise is then generated. The calculation for FCR rate is as follows: TOTAL "YES" RDP/TOTAL CONTACTS HANDLED. The point in time in which a customer commitment has been accomplished, should be inserted into the IVR decision tree and triggered at the appropriate time, if required.

An IVR, contact is generated to the customer, post any milestone requirements, and the customer is asked by the IVR, "You recently contacted [CLIENT] for [CAUSE CODE], was this issue resolved? Press 1 for "YES" and 2 for "NO" and "Were you satisfied with the service provided by _____" Press 1 for "YES" and 2 for "NO". IP network contacts are handled the same and made over the appropriate media.

The Exception Rate may be calculated as the total number of Exceptions divided by the total number of CDP's—the Exception Rate percentage is then multiplied by the Resolution Rate and subtracted from the Resolution Rate to give the billable Resolution Rate.

Voice Analytics may be used to determine whether key words and phrases are identified and used to produce "Cause Codes", the main reason why a customer contacted the BPO/contact center 205. Once generated, Cause Codes are sent to TruView where they are stack ranked and presented on the main dashboard in descending order.

Changes in contact patterns can be quickly identified and immediately addressed through the presentation of Cause Codes in TruView. If trends change dramatically, an alert is sent to the BPO/contact center 205 and the client's management and the Cause Code that is spiking can be examined through live monitoring. Additionally, FCR Rates for the Cause Code in question may be produced and if the FCR Rate is low for the Cause Code in question, a material process or training issue is quickly identified and can be addressed swiftly, thereby preserving FCR Rates.

When the resolver and the customer generate different dispositions for the same contact, it is defined as an Exception. An Exception report, which consists of: (a) the RDP; (b) CDP; and (c) contact recording may be bundled and presented to the DAA team. DAA analysts review every exception to determine the root cause of the Exception. The three categories of Exception root cause are process, training and behavior. The following are examples for each:

Example 1

Process: Assume that a customer contacted the BPO/contact center 205 to have an erroneous charge removed from their bill. The resolver follows procedure and orders the charge removed, and dispositions the contact as "YES". Due to an internal process error at the client, the charge is not removed and when the customer is contacted, the CDP returns as "NO". This creates an Exception and is routed to DAA for further review. The DAA analyst determines that this is a process error on the client's side and confirms the resolver followed procedure. As trends develop, it is established that 12% of all contacts are related to this same Cause Code. This information is relayed back to the client via a "Process Reconditioning Request". Once the process is reconditioned, the FCR rate is favorably impacted for 12% of all contacts.

Example 2

Training: The client releases a new product and prior to release, training is conducted for all resolvers. The training includes instructions on how to install the product and resolvers execute to plan. However, a glitch in the system occurs moments after install disabling the product and all that was required was the install of a driver to remedy the issue. Upon completion of the contact the resolver dispositions the record as "YES" and when surveyed the customer disposition is "NO". This creates an Exception and is routed to DAA for further review. The DAA analyst coordinates with the client and determines that this is a training error on the client's side and confirms the Resolver followed procedure. As trends develop it is established that 15% of all contacts are related to this same Cause Code. This information is relayed back to the BPO/contact center 205 training via a "Training Reconditioning Request". Once the resolvers receive recurrent training, the FCR rate is favorably impacted for 15% of all contacts.

Example 3

Behavior: The BPO/contact center 205 may reward resolvers with a high resolution rate and an individual resolver is close to being reward. He is near his lunch break and he rushes a call to check out on time. He dispositions the contact as "YES" and when surveyed, the customer dispositions the contact as "NO". This creates an Exception and is routed to DAA for further review. The DAA analyst determines that this is a behavior error. This information is relayed back to the resolver's supervisor 265 via a "Behavior Reconditioning Request". The supervisor 265 has three hours to meet with the resolver 255, review the call and initiate counseling, which is stored progressively in the TruView database 230. The resolver is now on notice and any further infractions of policy result in progressive counseling up to and including termination of employment.

Significant sampling of contacts that lack CDP data are randomly reviewed by DAA and blindly—meaning the DAA analyst cannot view either the RDP or CDP—and the DAA analyst produces a disposition upon completion of review. If a (shadow) Exception is generated as a result of this exercise, Exception Analysis as described herein below is conducted.

Significant samples of Exceptions are reviewed and the DAA analyst makes a determination as whether the root cause of the Exception was (a) a CRM or client policy/process issue, (b) a training issue, meaning the resolver obviously lacked the tools or training needed to resolve the contact, or (c) a behavior issue, meaning it appears that the resolver deliberately and wrongfully dispositioned the contact.

The following actions stem from the various combinations CDP and

| RDP | CDP | Likely Implication | Action Item |
| --- | --- | --- | --- |
| Yes | Yes | Good Performance | Reward |
| Yes | No | Resolver Behavior | Coach |
| No | Yes | Process Breakdown | Client interface to address process fix |
| No | No | Training Required | Establish trends, develop and execute on training |

As Exception analyses are produced, trends are analyzed and stack ranked in descending order. In the event that a CRM process is impeding FCR, and can be adjusted within the realm of fair practice, client approval may be sought, if required, and the process is adjusted. If resolver training is required to effect the process change, it is scheduled and executed upon as quickly as possible.

Both CRM and client process/policy reconditioning action items are tracked from the time the need was identified to the time the process or policy is fixed. Analysis that illustrates the impact of the broken process can be produced using the following calculation: TOTAL BROKEN PROCESS CONTACTS/TOTAL CONTACTS HANDLED. The percentage of this calculation is removed from the overall FCR rate to clearly illustrate the impact of the broken process thereby creating a crystal clear, tangible sense of urgency.

Resolvers who have ongoing high Resolution Rates, coupled with low Exception Rates, are recognized and rewarded in conjunction with an established program. Given the complexity of various scopes of work, reward and recognition programs are developed on a program-by-program basis.

Resolvers who demonstrate chronically low Resolution Rates and high Exception Rates are placed on probationary counseling. If it is determined that the barrier for improvement is rooted in "will", rather than "skill", termination of employment should occur upon a prescribed fair HR practice.

As Exceptions statistics are analyzed using TruView reporting tools, common trends in unresolved Cause Codes quickly emerge. This information is organized by: (a) frequency in Cause Code; and (b) Exception Rates in descending order. The most frequent Cause Codes coupled with the highest Exception Rates allows for targeted training.

The BPO and client should budget approximately 2 hours per resolver per week for recurrent training. This training might be for an individual resolver or a group of resolvers.

As data is collected for the client, the client/BPO may establish a normal learning curve period for the group of resolvers assigned to the account. This learning curve will allow the CRM group to identify and correct performance and behavior trends as early as possible, while giving resolvers the appropriate amount of time to learn the client's business.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system for customer contact management, comprising:
  a contact center including an interne connection, automatic call distributor (ACD) means, computer/telephony integration means, interactive voice response means, a database, and a plurality of resolvers, wherein said contact center is coupled to receive contacts from a network via a router/gateway and present each of the contacts to one or more of said plurality of resolvers;
  a balanced service process, comprising:
    means for determining and managing real-time, intraday, and historical resolver disposition of contact (RDP), customer disposition of contact (CDP), first contact resolution (FCR) rates, and customer satisfaction (CSAT);
    means for dynamically reporting issues driving contact volume, said issues including said real-time, intraday, and historical RDP, CDP, FCR and CSAT, exception rates, and a plurality of cause codes;
    means for determining every contact that was not resolved; and
    a closed loop channel to define, report and correct actions and trending issues that impede FCR and CSAT, based on said dynamically reported issues driving contact volume.

2. The system according to claim 1, wherein said contact center comprises a single location.

3. The system according to claim 2, wherein said contact center comprises a work at home location.

4. The system according to claim 1, wherein said contact center comprises a plurality of locations.

5. The system according to claim 4, wherein said plurality of locations comprises one or more work at home locations.

6. The system according to claim 1, wherein said ACD means comprises an internet call management device.

7. The system according to claim 1, wherein said network comprises a public switched telephone network.

8. The system according to claim 1, wherein said network comprises an IP network.

9. The system according to claim 1, wherein said contact center is coupled to receive contacts from said network via a switch or the interne.

10. The system according to claim 1, wherein said contacts comprise one or more of voice calls, SMS messages, e-mails, chat and social media contacts.

11. A computer-implemented method comprising:
  receiving a plurality of customer contacts in a contact center which includes an internet connection, automatic call distributor means, computer/telephony integration means, interactive voice response means, a database, and a plurality of resolvers;

presenting each said contact to one or more of said plurality of resolvers;

determining a cause of each said contact;

determining resolver disposition of contact (RDP), customer disposition of contact (CDP), first contact resolution (FCR) rates and customer satisfaction (CSAT) for each said contact;

providing a closed loop channel to define trending issues that impede FCR and CSAT;

dynamically reporting said trending issues that impede FCR and CSAT; and dynamically reporting issues driving a contact volume, said issues including said real-time, intraday, and historical RDP, CDP, FCR and CSAT, exception rates, and a plurality of cause codes.

12. The computer-implemented method according to claim 11, further comprising:

storing said FCR and CSAT data and rates in said database; and determining which ones of said contacts that were not resolved.

13. The computer-implemented method according to claim 11, further comprising:

initiating an issue resolution and CSAT survey with said interactive voice response means, e-mail, SMS or chat; and storing the results of said survey in said database.

14. A non-transitory computer-readable medium, in a machine-readable storage device, storing a computer program product, the computer program product including instructions that, when executed, cause a balanced service processor to perform operations comprising:

receiving a plurality of customer contacts in a contact center which includes an internet connection, automatic call distributor means, computer/telephony integration means, interactive voice response means, a database, and a plurality of resolvers;

routing each said contact to one or more of said plurality of resolvers;

determining a cause of each said contact; and determining resolver disposition of contact (RDP), customer disposition of contact (CDP), true first contact resolution (FCR) rates, and customer satisfaction (CSAT) for each said contact; and providing a closed loop channel to define trending issues that impede FCR and CSAT;

performing operations for dynamically reporting issues driving a contact volume, said issues including said real-time, intraday, and historical RDP, CDP, FCR and CSAT, exception rates, and a plurality of cause codes;

performing operations for dynamically reporting issues driving a contact volume, said issues including said real-time, intraday, and historical RDP, CDP, FCR and CSAT, exception rates, and a plurality of cause codes; and dynamically reporting said trending issues that impede FCR and CSAT.

15. The non-transitory computer-readable medium according to claim 14, further comprising instructions that, when executed, cause the balanced service processor to perform operations for storing said FCR and CSAT rates in said database.

16. The non-transitory computer-readable medium according to claim 14, further comprising instructions that, when executed, cause the balanced service processor to perform operations for determining which ones of said contacts that were not resolved.

17. The non-transitory computer-readable medium according to claim 16, further comprising instructions that, when executed, cause the balanced service processor to perform operations for:

initiating an issue resolution and CSAT survey with said interactive voice response means; and storing the results of said survey in said database.

* * * * *